US011900906B2

(12) United States Patent
Mohr

(10) Patent No.: US 11,900,906 B2
(45) Date of Patent: Feb. 13, 2024

(54) BELL AND HAMMER ROTATIONAL DEVICE

(71) Applicant: MalMark-Bellcraftsmen, Plumsteadville, PA (US)

(72) Inventor: Derek Mohr, Plumsteadville, PA (US)

(73) Assignee: Malmark Bells, Inc., Plumsteadville, PA (US)

( * ) Notice: Subject to any disclaimer, the term of this patent is extended or adjusted under 35 U.S.C. 154(b) by 406 days.

(21) Appl. No.: 17/319,164

(22) Filed: May 13, 2021

(65) Prior Publication Data

US 2022/0366885 A1 Nov. 17, 2022

Related U.S. Application Data

(63) Continuation of application No. 17/319,038, filed on May 12, 2021, now Pat. No. 11,164,552.

(51) Int. Cl.
*G10K 1/074* (2006.01)
*G10K 11/16* (2006.01)

(52) U.S. Cl.
CPC .............. *G10K 1/074* (2013.01); *G10K 11/16* (2013.01)

(58) Field of Classification Search
CPC ............................... G10K 11/16; G10K 1/074
See application file for complete search history.

(56) References Cited

U.S. PATENT DOCUMENTS

| | | | | | |
|---|---|---|---|---|---|
| 391,108 | A * | 10/1888 | Atkinson | G10K 1/07 | 116/154 |
| 2,554,046 | A * | 5/1951 | Moard | G10K 1/074 | 116/154 |
| 2,685,148 | A * | 8/1954 | Fisher | A63H 5/00 | 116/148 |
| 4,135,474 | A * | 1/1979 | Kaplan | G10K 1/072 | 116/95 |
| 5,986,541 | A * | 11/1999 | Hibiya | G10K 1/064 | 116/152 |
| 11,164,552 | B1 * | 11/2021 | Mohr | G10K 11/16 | |

* cited by examiner

*Primary Examiner* — Forrest M Phillips
(74) *Attorney, Agent, or Firm* — IP Works Law, PLLC

(57) ABSTRACT

A bell and hammer rotational device is shown and described. The bell and hammer rotational device includes a frame which is made up of at least two side walls. The frame has a spindle rotatably secured thereto. A rotational device is coupled to the spindle such that the spindle will rotate the rotational device, when the spindle is rotated. At least one bell is secured about a perimeter of the rotational device. A bell hammer is secured to the frame. The bell hammer is positioned such that it will strike the at least one bell, at least once, with each revolution of the rotational device.

18 Claims, 11 Drawing Sheets

BELL AND HAMMER ROTATIONAL DEVICE

CROSS REFERENCE TO RELATED APPLICATIONS

This application claims the benefit of U.S. application Ser. No. 17/319,038 filed on May 12, 2021. The above identified patent application is herein incorporated by reference in its entirety to provide continuity of disclosure.

BACKGROUND OF THE INVENTION

The present invention relates to a bell and hammer rotational device. More particularly, the present invention provides a rotational device having bells located thereon with an external hammer for ringing the bells.

Bells have been used throughout history to produce sounds for a vast quantity of reasons. Bells have been used as warnings, music making devices, or for other notifications purposes. The usefulness of the bell is unmistakable. As such the technology behind bells and striking a bell is ever evolving.

Throughout history two primary striking methods for bells has emerged. The first is having an internal clapper. This clapper is usually in the form of a free-swinging device which is secured to the interior of the bell. The second method is via a hammer. A hammer is a device which is not secured to the bell and is used to strike the bell, then be removed from contact. Hammers traditionally produce a crisper and overall better sound.

Bells have been used for notification purposes throughout history. Many are familiar with the bell placed on a desk to gain the attention of the desk attendant or the bell hung above a shop door to alert one to an entrance of a customer. Even doorbells used to be made from actual bells. One of these doorbell designs allowed the movement of various bells on wheels as the device was moved. This would cause an interior clapper to ring the bell. There are many downfalls with the prior art design. The largest of which is the use of an internal clapper. This design leads to several drawbacks as discussed above and more which will be detailed throughout this specification.

Consequently, there is a need for an improvement in the art of bells and wheels having bells thereon. The present invention substantially diverges in design elements from the known art while at the same time solves a problem many people face when attempting to ring multiple bells with one continuous motion. In this regard, the present invention substantially fulfills these needs.

SUMMARY OF THE INVENTION

The present invention provides a bell and hammer rotational device wherein the same can be utilized for providing convenience for the user when wishing to ring a plurality of bells having a crisp sweet sound. The bell and hammer rotational device is comprised of a frame which includes at least two side walls. The frame has a spindle rotatably secured thereto. A rotational device is coupled to the spindle and the spindle will rotate the rotational device. A bell is secured about the rotational device. A bell hammer is secured to the frame. The bell hammer is positioned such that it will strike the bell, at least once, with each revolution of the rotational device.

Another object of the bell and hammer rotational device is to have a plurality of bells secured about a perimeter of the rotational device.

Another object of the bell and hammer rotational device is to have each of the plurality of bells secured at equal distances apart about the perimeter of the rotational device.

Another object of the bell and hammer rotational device is to have the bell hammer rotatably secured to the frame.

Another object of the bell and hammer rotational device is to have a handle secured to the spindle.

Another object of the bell and hammer rotational device is to have a counterweight secured to the bell hammer at an upper end of a hammer shaft.

Another object of the bell and hammer rotational device is to have the plurality of bells comprise of bells having differing sizes.

Another object of the bell and hammer rotational device is to have the rotational device be circular.

Another object of the bell and hammer rotational device is to have the rotational device have at least one spoke therein.

Another object of the bell and hammer rotational device is to have the bell secured via a nut and bolt connection.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

LIST OF REFERENCE NUMERALS

Figure 1:
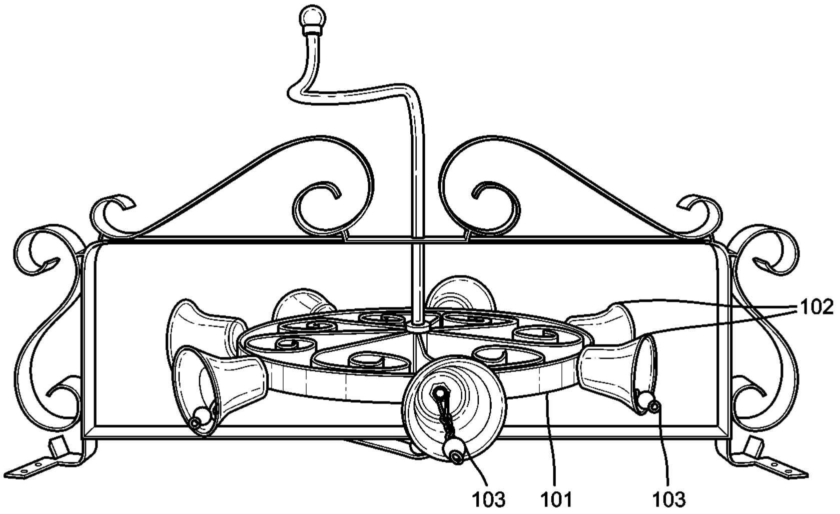
FIG. 1 (Prior Art)
FIG. 1 shows a side view of a prior art bell device.

With regard to the reference numerals used, the following numbering is used throughout the drawings.

101 Bells
102 Wheel
103 Ringing Device
201 rotational Device
202 Spokes
203 At Least One Bell
301 Frame
301*a* Sidewall
301*b* Top Cross Bar
301*c* Bottom Cross Bar
302 Aperture
303 Spindle
304 Decorative Items
305 Brackets
305*a* Apertures
401 Handle
402 Hammer
403 Hammer Rod
404 Second Spindle
405 Counterweight
501 Nut
502 Bolt
503 Washer
601 Stabilizing Device
701 Frame
701*a* Sidewalls
701*b* Top Cross Bar
701*c* Bottom Cross Bar
702 Spindle
703 Handle
704*a* First Rotational Device
704*b* Second Rotational Device
704*c* Third Rotational Device
705*a* At Least One Bell
705*b* At Least One Bell
705*c* At Least One Bell
706*a* At Least One Spoke
706*b* At Least One Spoke
706*c* At Least One Spoke
707*a* First Hammer
707*b* Second Hammer
707*c* Third Hammer
708*a* First Hammer Shaft
708*b* Second Hammer Shaft
708*c* Third Hammer Shaft
709*a* Counterweight
709*b* Counterweight
709*c* Counterweight

DETAILED DESCRIPTION OF THE INVENTION

Reference is made herein to the attached drawings. Like reference numerals are used throughout the drawings to depict like or similar elements of the bell wheel and hammer device. For the purposes of presenting a brief and clear description of the present invention, a preferred embodiment will be discussed as used for the bell wheel and hammer device. The figures are intended for representative purposes only and should not be considered to be limiting in any respect.

Referring now to FIG. 1, there is shown a side view of a prior art bell device. The prior art device has a wheel 101 containing a plurality of bells 102. These bells 102 have internal ringing devices 103. The internal ringing devices 103 will ring each of the bells 102 as the wheel 101 rotates. In the prior art there is no way to determine when the bell 102 will be rung. It can be rung at any instant. This means that more than one bell may be run at once. Further, the bell 102 may not be struck at the most opportune time meaning the bell 102 will produce a less than optimal sound. The internal ringing devices 103 will have all the drawbacks as discussed above and none of the benefits of any of the new embodiments described throughout.

Figure 2:
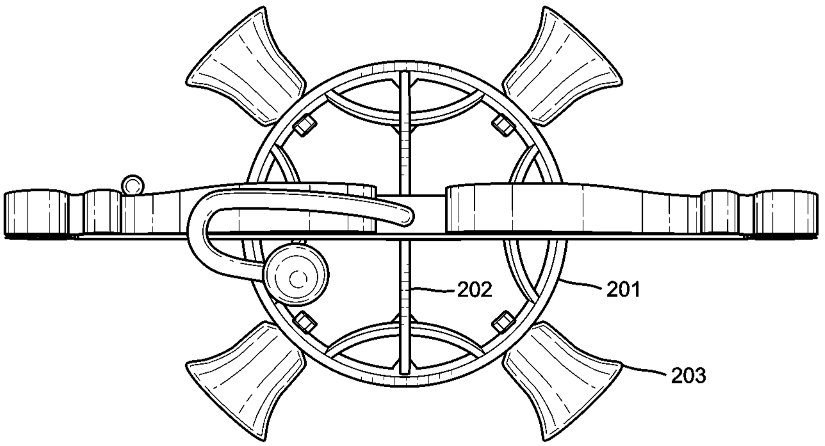
FIG. 2 shows a side view of an embodiment of the bell and hammer rotational device.

Referring now to FIG. 2, there is shown a top-down view of an embodiment of the bell and hammer rotational device. The device is comprised of a rotational device 201. In the shown embodiment the rotational device 201 is a circular shape. In another embodiment the rotational device 201 is of another geometric shape. See FIGS. 6A-6C for a further description of the different shapes and benefits for each.

In one embodiment the rotational device 201 includes a spoke 202. In one embodiment a spoke will travel through the center of the rotational device 201. This will allow the rotational device 201 to be attached to a spindle (303 of FIG. 3). In another embodiment the spokes 201 are connected to a connection piece which will connect to the spindle (303 of FIG. 3). In a further embodiment there are multiple spokes 202. This will add additional support for the rotational device 201. In some embodiments, as seen throughout this disclosure, the spokes 202 are used as decorative pieces in addition to structural elements. The spoke patterns are in no way limiting upon the disclosure and as such, many different patterns may be used.

The rotational device 201 will allow for at least one bell 203 to be secured thereto. In the shown embodiment the at least one bell 203 is secured about the perimeter of the rotational device 201. As the rotational device 201 is spun the at least one bell 203 will rotate. In the shown embodiment there is more than one bell 203 secured to the rotational device 201. In one embodiment the bells 203 are placed at equal distances around the rotational device 201. In a further embodiment the bells 203 are placed around a perimeter of the rotational device 201. This will produce a repeating sound.

Figure 3:
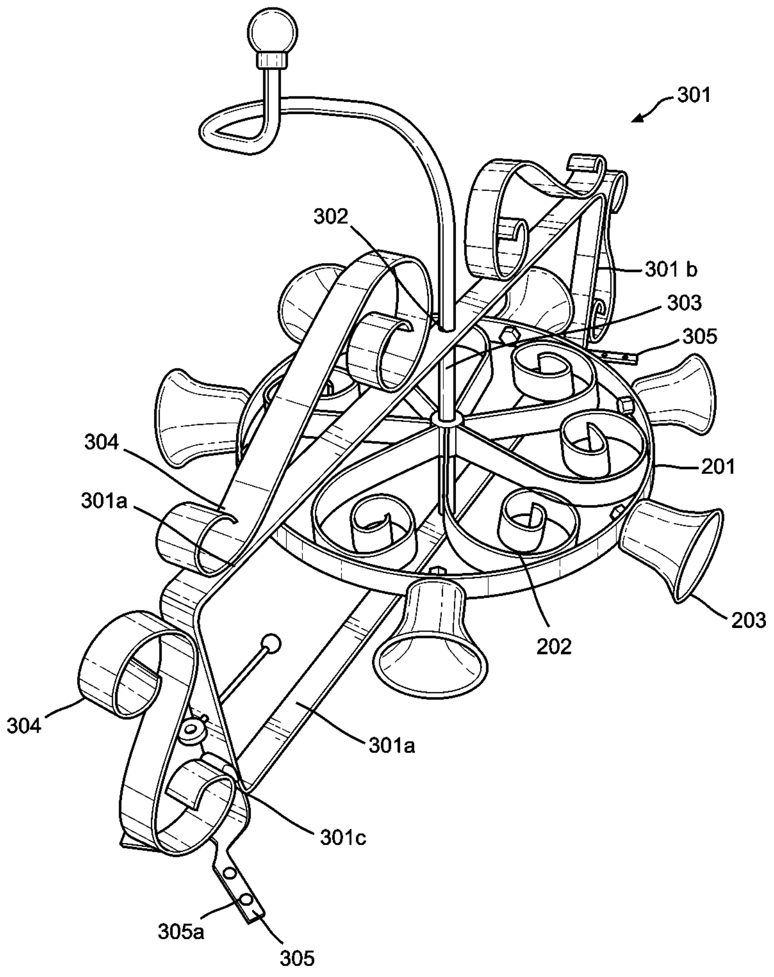
FIG. 3 shows a perspective view of an embodiment of the bell and hammer rotational device.

Referring now to FIG. 3, there is shown a perspective view of an embodiment of the bell and hammer rotational device. The bell and hammer rotational device is comprised of a frame 301. In different embodiments the frame may have different structural features. Each frame configuration will allow for a rotational device 201 to support bells 203 and have the bells 203 rung by a hammer. In the shown embodiment the frame includes a pair of sidewalls 301*a*. The pair of sidewalls are connected to a top cross bar 301*b* and a bottom cross bar 301*c*. In this embodiment the frame 301 forms a rectangular shape. The rectangular shape will provide adequate support for a variety of different rotational devices 201.

In the shown embodiment the pair of sidewalls 301*a* each have an aperture 302 located therethrough. A spindle 303 is rotatably secured to the frame 301 via the apertures 302. This will allow the spindle 303 to be rotatably coupled to the frame 301. In another embodiment the spindle 303 is rotatably secured to the frame via only one aperture and a tubing secured about the aperture 302. The spindle 303 is further coupled to the rotational device 201 via the at least one spoke 202. When the spindle 303 is rotated the rotational device 201 will also rotate. The spindle 303 will position the rotational device 201 such that the bells 203 will be rotated within the frame 301.

In the shown embodiment the frame 301 has at least one decorative item 304 secured thereto. The decorative item(s) 304, unless otherwise stated, are for aesthetics only. However, some decorative items 304 will have special purposes.

In the shown embodiment the decorative items 304 are secured to the external parts of the frame 301. In the shown embodiment the spokes 202 are also decorative. The spokes 202 are still connected from the center of the rotational device 201 to the interior perimeter of the rotational device 201, thus securing the rotational device 201 to the spindle 303.

In various embodiments the frame 301 will include at least one mounting bracket 305. In the shown embodiment the mounting brackets 305 are bars which extend from the frame 301. The bars have apertures 305*a* located therethrough. The apertures 305*a* will allow for securement devices to be placed therein. The securement devices may include, but are not limited to, screws, nails, or bolts. This will allow for the device to be secured to various structures.

Figure 4A:
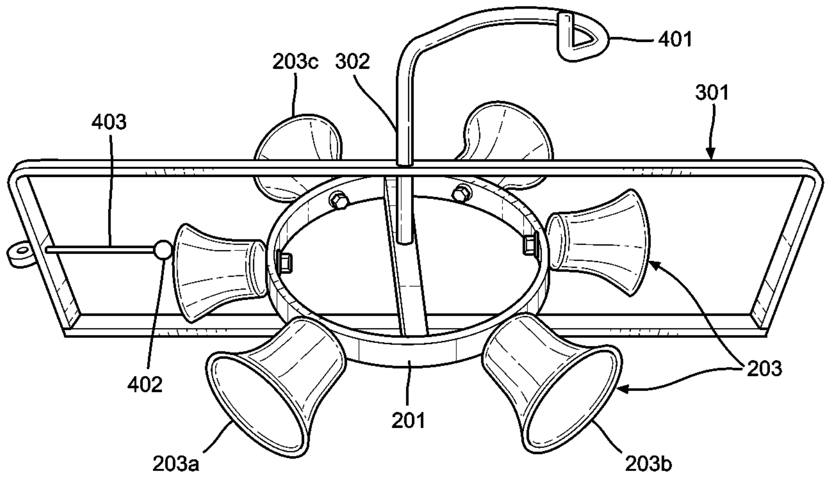
FIG. 4A shows a perspective view of an embodiment of the bell and hammer rotational device.

Referring now to FIG. 4A, there is shown a perspective view of an embodiment of the bell and hammer rotational device. In one embodiment the spindle 302 has a handle 401 secured thereto. The handle 401 will allow for the rotation device 201 to be manually rotated. In another embodiment the spindle 302 has a pulley attached thereto. The pulley will allow for rotation via a belt drive and motor. In yet a further embodiment, the spindle 302 is directly attached to a rotational motor. This will allow for a rotation via only a motor.

In one embodiment a plurality of bells 203 are used. In a further embodiment the plurality of bells is comprised of different sized bells 203. A first set of bells 203 is made up of large sized bells 203*a*. A second set of bells 203 is made up of medium sized bells 203*b*. A third set of bells is made up of small sized bells 203*c*. These different sized bells 203 will allow for a single device to produce multiple different sounds. In one embodiment the bells are spaced equal distances apart around the rotation device 201. In another embodiment the bells 203 are placed at varying intervals along the rotational device 201. This will allow the device to encompass, for example, different musical tempos or better spacing of different sized bells.

Each bell 203 is rung at least once per rotation via a hammer 402. The hammer 402 may be of many different shapes and sizes. In one embodiment the hammer 402 is shaped like a cylinder. This shape is more of a traditional hammer shape. In another embodiment the hammer 402 is a sphere. This shape will ensure solid contact with the bell 203 at only one point. In various embodiments the hammer 402 is made from different materials. One benefit from different materials is the hardness of the materials. Different hardness will produce different sounds when the bell 203 is struck. Further benefits of different hardness pertain to forces required to produce the desired sound. In an embodiment with a harder hammer the force required to produce a sound is much less than that of a softer hardness. Hardness will not only allow for different forces to be used but as a result can also effect the volume of the bells.

In some embodiments the hammer 402 is secured to a hammer rod 403. The hammer rod 403 will be secure to the frame 301. The hammer rod 403 may have a variety of different lengths. Different lengths will allow for different swing lengths and different forces to be applied to the bell. In one embodiment the hammer rod 403 has an adjustable length. This will allow the hammer rod to be of a single length while allowing for different forces and swing lengths of the hammer 402.

Figure 4B:
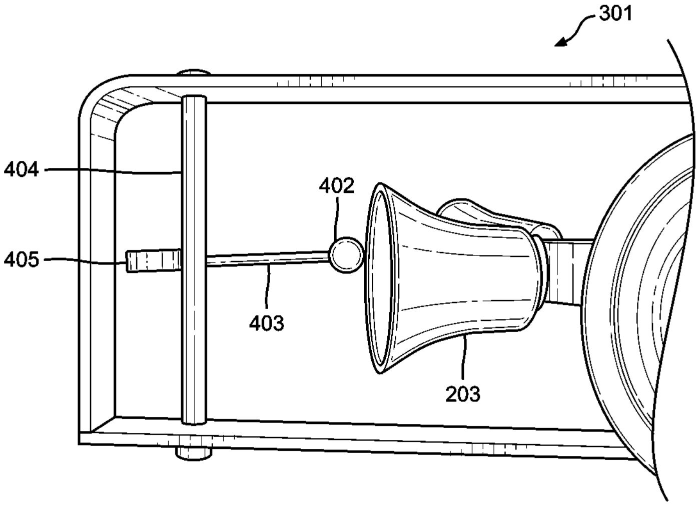
FIG. 4B shows a close-up view of an embodiment of the bell and hammer rotational device.

Referring now to FIG. 4B, there is shown a close-up view of an embodiment of the bell and hammer rotational device. In this embodiment a different version of the hammer 402 is shown. In this embodiment the hammer 402 is rotatably secured to the frame 301. This will allow the hammer 402 to function similar to a pendulum. In yet another embodiment the hammer 402 is secured to the frame or rotational device using a spring. In the embodiment where the hammer 402 is secured to the rotational device, the hammer will be able to tilt back and forth striking bells positioned on either side as the rotational device 201 turns.

In the shown embodiment the hammer 402 is connected to a second spindle 404. The second spindle 404 is rotatably coupled to the frame 301. This will allow the hammer 402 to rotate each time it strikes a bell 203. In different embodiments the hammer rod 403 is of differing lengths. This will allow the hammer 402 to be positioned to properly hit different sized bells 203.

In one embodiment there is a counterweight 405 secured to the hammer rod 403 at the end opposite the hammer 402. The counterweight 405 will prevent the hammer 402 from swinging back to the starting position too quickly striking the bell 203 for an unintended second time. In different embodiments the hammer rod 403 will extend to different lengths past the second spindle 404. This will allow for a single counterweight 405 to have differing effects on the hammer swing speed.

Figure 5:
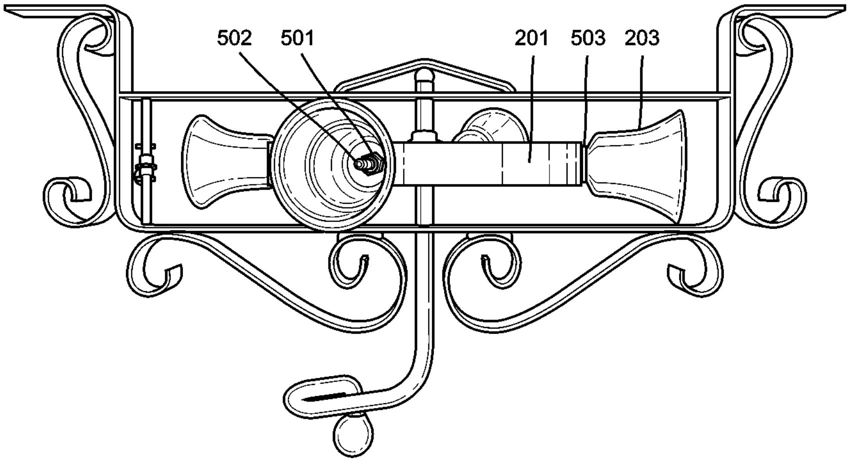
FIG. 5 shows a side view of an embodiment of the bell and hammer rotational device.

Referring now to FIG. 5, there is shown a side view of an embodiment of the bell and hammer rotational device. In different embodiments the bells 203 are secured to the rotational device 201 in different ways. In one embodiment the bells 203 are secured to rotational device 201 via welds. This will secure the bells 203 directly to the rotational device 201 in a permanent manner. This of course, has the drawback of preventing the bells 203 from being easily removed.

In another embodiment the bells 203 are secured to the rotational device 201 via a nut 501 and bolt 502. In one embodiment the bolt 502 is placed through an aperture in the rotational device 201 and an aperture in the bell 203. The nut 501 is then secured to the bolt 502 thus securing the bell 203 to the rotational device 201. In one embodiment the nut 501 and bolt 502 are made from nylon. The nylon will allow the bell to produce the best possible sound due to the insulative properties the material possesses. In yet another embodiment a washer 503 is placed between the rotational device 201 and the bell 203. In one embodiment the washer 503 is made from a rubber material. In another embodiment the washer 503 is made from nylon.

Figure 6A:
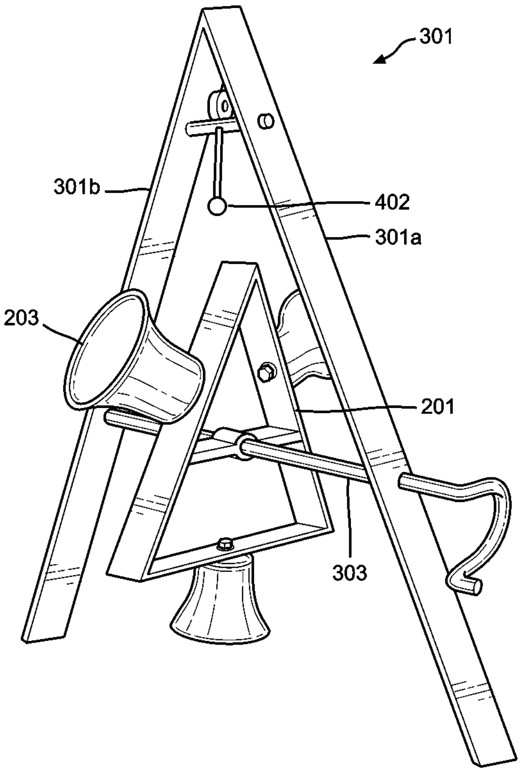
FIG. 6A shows a perspective view of an embodiment of the bell and hammer rotational device.
Figure 6B:
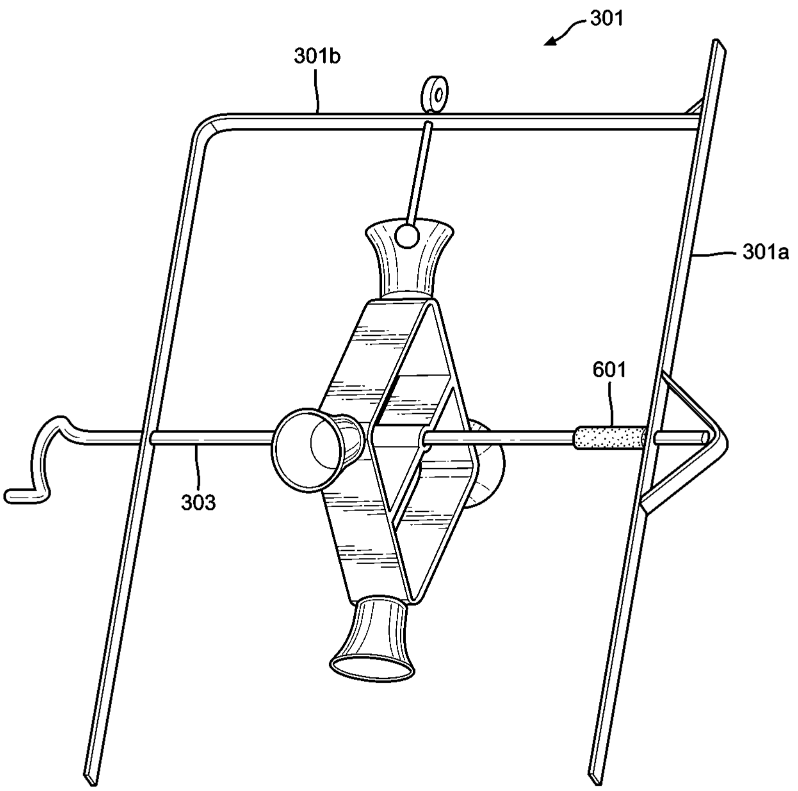
FIG. 6B shows a perspective view of an embodiment of the bell and hammer rotational device.
Figure 6C:
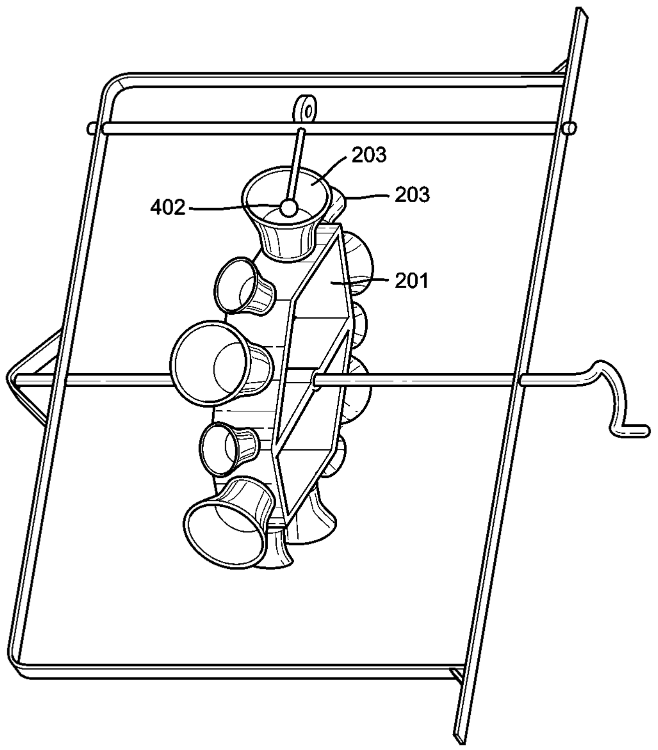
FIG. 6C shows a perspective view of an embodiment of bell and hammer rotational device.

Referring now to FIG. 6A-FIG. 6C there is shown perspective views of embodiments of the bell and hammer rotational device. In these figures there are shown different shapes possible for the rotational device and different frame configurations. These configurations in no way alter the overall concept of the disclosure and therefore should not be considered separated from FIG. 2-FIG. 5.

In one embodiment the frame 301 of the device includes only a pair of sidewalls 301*a*. In one embodiment the pair of sidewalls 301*a* are parallel to each other as previously shown. In one embodiment the pair of sidewalls 301*a* form a triangular shape. This shape will allow for the rotational device 201 to be secured therein and for the hammer 402 to still be positioned in a location adequate to contact the bells 203. This frame configuration will also eliminate the need for cross bars and thus will reduce weight.

In another embodiment the frame 301 is comprised of a single sidewall 301*a* and a top cross bar 301*b*. In this embodiment the spindle 303 is still rotatably coupled to the sidewall 301*a*. In one embodiment a stabilizing device 601 is added to the connection. The stabilizing device 601 will better allow the spindle 303 to support the rotational device 201. The hammer 402 will be secured to the top cross bar 301*b* allowing it to properly strike the bells 203. In one embodiment the top cross bar 301_b_ is cylindrically shaped to easily allow the hammer 402 to be rotatably secured thereto. In another embodiment the top cross bar 301_b_ has a connection point secured thereto which will allow the hammer 402 to be rotatably coupled thereto. In one embodiment the connection point is a rounded section of the top cross bar 301_b_. In another embodiment the connection point is comprised of an aperture having a connection point therein which will allow for the hammer 402 to be rotatably coupled thereto.

In one embodiment, as described above, the rotational device 201 is circular. In another embodiment the rotational device 201 is square. In this embodiment bells 203 may be secured to the corners of the square. In another embodiment smaller bells 203 are secured to the corners and larger bells 203 are secured along the sidewalls 301_a_. This will allow the hammer 402 to strike each bell 203 in the same location despite the size.

In one embodiment the rotational device 201 is a triangular shape. The triangular shape will allow for larger bells 203 to be placed on the sidewalls 301_a_ of the triangle while ensuring the rotational device 201 will still fit within the frame 301. In yet a further embodiment the rotational device is hexagonal. In the shown embodiment smaller bells 203 are added to the corners of the rotational device 201 while larger bells 203 are located on the walls of the rotational device 201.

In yet other embodiments the rotational device 201 is of another geometric shape. Different geometric shapes will present different aesthetic features as well as different functional features for bell placement.

Figure 7:
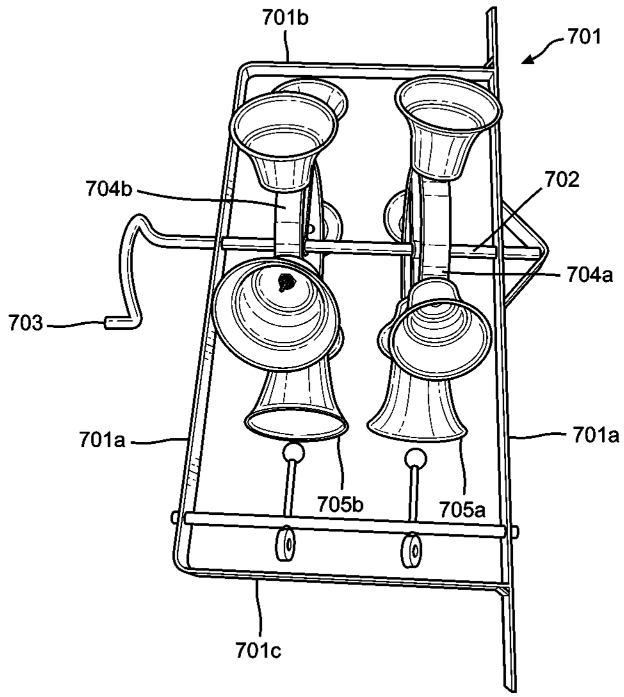
FIG. 7 shows a perspective view of an alternative embodiment of the bell rotational device and hammer device having two rotational devices.
Figure 8:
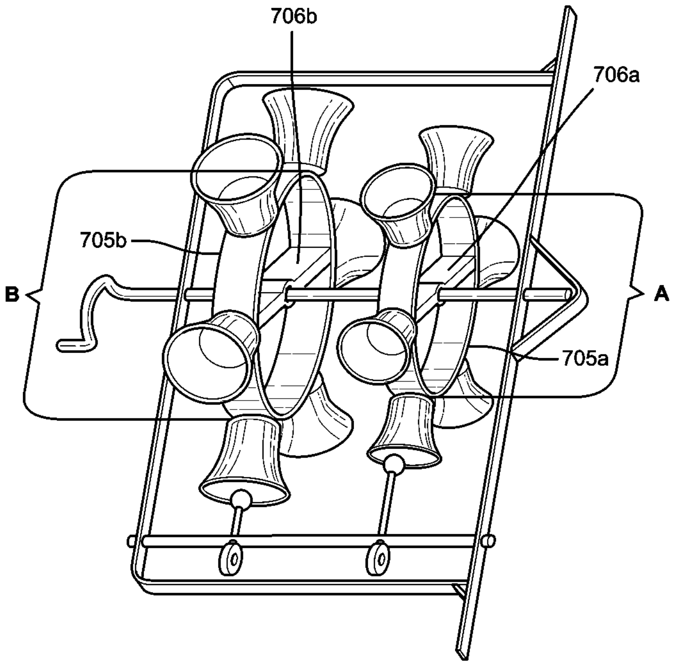
FIG. 8 shows a perspective view of an alternative embodiment of the bell rotational device and hammer device having two rotational devices of different sizes.
Figure 9:
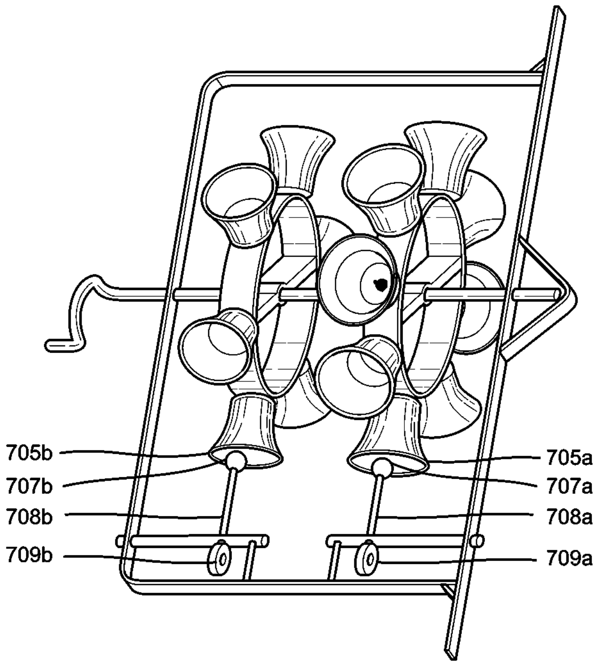
FIG. 9 shows a perspective view of an alternative embodiment of the bell rotational device and hammer device having two rotational devices with bells of different sizes.

Referring now to FIG. 7, FIG. 8, and FIG. 9, there is shown perspective views of an alternative embodiment of the bell and hammer rotational device having two rotational devices. For purposes of this disclosure, it is to be understood that any of the above-mentioned options for shape, size and component options may also be incorporated into the features described below as it relates to an additional rotational device. In one embodiment the bell rotational and hammer device is comprised of a frame 701. In the shown embodiment the frame includes a pair of sidewalls 701_a_. The frame further includes a top cross bar 701_b_ and a bottom cross bar 701_c_. In this embodiment the frame 701 is rectangular. However, other shapes may be used as described above.

The device includes a spindle 702. In the shown embodiment the spindle 702 is rotatably secured to each of the sidewalls 701_a_. This will provide a stable connection which will support the spindle 702. In the shown embodiment the spindle 702 has a handle 703 attached thereto. The handle 703 will allow a user to rotate the spindle 702 with ease. In another embodiment the spindle 702 is rotated using a motor configuration as described above.

The spindle 702 has a first rotational device 704_a_ secured thereto. The first rotational device 704_a_ has at least one spoke 706_a_ secured therein. In one embodiment the at least one spoke 706_a_ is a decorative spoke. The at least one spoke 706_a_ will allow the spindle 702 to spin the first rotational device 704_a_. The first rotational device 704_a_ has at least one bell 705_a_ secured thereto. In one embodiment the at least one bell 705_a_ is secured about a perimeter of the first rotational device 704_a_. The at least one bell 705_a_ may be secured in any of the ways discussed herein.

The first rotational device 704_a_ has a first hammer 707_a_. In the shown embodiment the first hammer 707_a_ is a sphere but other shapes may be used. Further, the hammer 707_a_ may be made out of different materials to alter the hardness of the hammer. In one embodiment the first hammer 707_a_ is secured to a first hammer shaft 708_a_. In one embodiment the length of the first hammer shaft 708_a_ is adjustable. This will allow for the first hammer 707_a_ to have an adjustable swing radius.

In some embodiments the first hammer 707_a_ and first hammer shaft 708_a_ is secured in a fixed manner to the frame 701. In another embodiment the first hammer 707_a_ is rotatably secured to the frame 701. In one embodiment a counterweight 709_a_ is secured to the first hammer shaft 708_a_ at an end opposite the first hammer 707_a_. The first counterweight 709_a_ will allow for the first hammer 707_a_ to have an adjustable return speed. This will allow for the at least one bell 705_a_ to clear the second hammer 707_b_ before it returns to its original position.

In this embodiment the bell and hammer rotational device is comprised of a second rotational device 704_b_. The second rotational device 704_b_ is secured to the spindle 702. The second rotational device 704_b_ has at least one spoke 706_b_ secured therein. In one embodiment the at least one spoke 706_b_ is a decorative spoke. The at least one spoke 706_b_ will allow the spindle 702 to spin the second rotational device 704_b_ and the first rotational device 704_a_ simultaneously. The second rotational device 704_b_ has at least one bell 705_b_ secured thereto. The at least one bell 705_b_ may be secured in any of the ways discussed herein.

The second rotational device 704_b_ has a second hammer 707_b_. In the shown embodiment the second hammer 707_b_ is a sphere but other shapes may be used. Further, the second hammer 707_b_ may be made out of different materials to alter the hardness of the hammer. The second hammer 707_b_ is secured to a second hammer shaft 708_b_. In one embodiment the length of the second hammer shaft 708_b_ is adjustable. This will allow for the second hammer 707_b_ to have an adjustable swing radius.

In some embodiments the second hammer 707_b_ and second hammer shaft 708_b_ is secured in a fixed manner to the frame 701. In another embodiment the second hammer 707_b_ is rotatably secured to the frame 701. In one embodiment a counterweight 709_b_ is secured to the second hammer shaft 708_b_ at an end opposite the second hammer 707_b_. The counterweight 709_b_ will allow for the second hammer 707_b_ to have an adjustable return speed. This will allow for the at least one bell 705_b_ to clear the second hammer 707_b_ before it returns to its original position.

In one embodiment the first rotational device 704_a_ and the second rotational device 704_b_ are of different sizes. In the shown embodiment this means that diameter A is of a different length from diameter B. In other embodiments this means that the length and/or widths of the rotation devices are different. In one embodiment this means that same sized bells can be rotated at different speeds. In another embodiment this will allow for bells of different sizes to be secured to the rotational devices while still being of a size to fit within the frame 701.

In another embodiment the rotational devices are the same size. However, the bells 705_a_, 705_b_ are of different sizes. In one embodiment the bells 705_a_, 705_b_ are of a different size per respective rotational device. In another embodiment the bells 705_a_, 705_b_ are of varying sizes regardless of which rotational device they are secured to.

Figure 10:
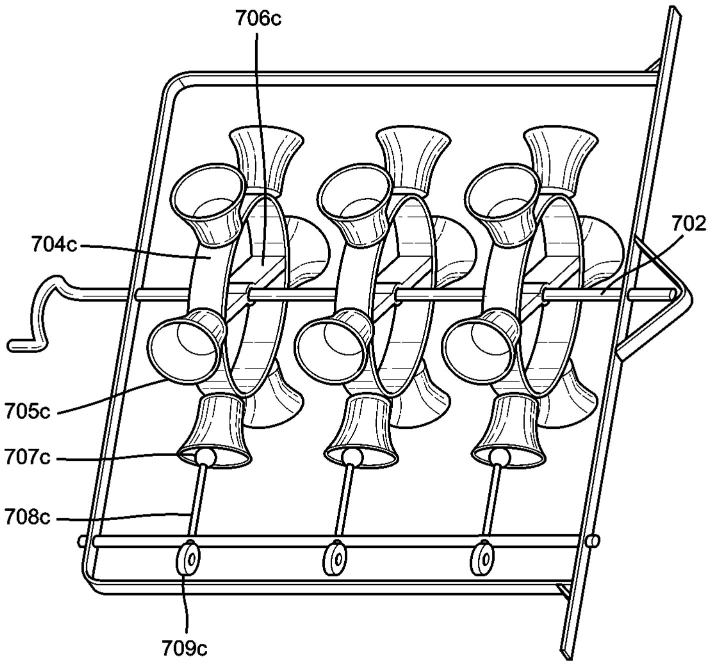
FIG. 10 shows a perspective view of an alternative embodiment of the bell rotational device and hammer device having multiple rotational devices.

Referring now to FIG. 10, there is shown a perspective view of an alternative embodiment of the bell rotational device and hammer device having multiple rotation devices. In different embodiments there are differing numbers of rotational devices. This disclosure is not meant to be limiting on the number of rotational devices used. For example, in the shown embodiment the bell and hammer rotational device is comprised of a third rotational device 704*c*. The third rotational device 704*c* is secured to the spindle 702. The third rotational device 704*c* has at least one spoke 706*c* secured therein. In one embodiment the at least one spoke 706*c* is a decorative spoke. The at least one spoke 706*c* will allow the spindle 702 to spin the third rotational device 704*c* simultaneously with the first and second rotational devices 704*a*, 704*b*. The third rotational device 704*c* has at least one bell 705*c* secured thereto. The at least one bell 705*c* may be secured in any of the ways discussed herein.

The third rotational device 704*c* has a third hammer 707*c*. In the shown embodiment the third hammer 707*c* is a sphere but other shapes may be used. Further, the third hammer 707*c* may be made out of different materials to alter the hardness of the hammer. The third hammer 707*c* is secured to a third hammer shaft 708*c*. In one embodiment the length of the third hammer shaft 708*c* is adjustable. This will allow for the third hammer 707*c* to have an adjustable swing radius.

In some embodiments the third hammer 707*c* and third hammer shaft 708*c* are secured in a fixed manner to the frame 701. In another embodiment the third hammer 707*c* is rotatably secured to the frame 701. In one embodiment a counterweight 709*c* is secured to the third hammer shaft 708*c* at an end opposite the hammer. The counterweight 709*c* will allow for the hammer to have an adjustable return speed. This will allow for the at least one bell 705*c* to clear the third hammer 707*c* before it returns to its original position.

In various embodiments similar to the descriptions above the rotational devices are of varying sizes. For example, each of the rotational devices may be a different size. In another embodiment only one of the rotational devices is of a different size. Similarly, the bells secured to each rotational device may be of different sizes. In one embodiment the bells on each rotational device are of the same size respectively. In another embodiment the bells on each rotational device are of different sizes.

The below descriptions allow for modifications to be made to any of the above-described embodiments. These modifications do not change the crux of the invention and seek to only make additions thereto. The below embodiments are in no way limiting on the previous disclosure.

In one embodiment the bell and hammer rotational device is designed to be carried or handheld. In one embodiment a second handle is secured to the frame 201. In one embodiment the second handle is similar to that of a beer stein. The second handle is attached to a sidewall of the frame and creates a rectangular shape for grasping. This will allow a user to grasp the second handle with one hand and spin the handle secured to the spindle with the other.

In another embodiment the device includes a mounting location. This mounting location is different than the mounting brackets previously discussed. In this embodiment the mounting location will allow the device to be secured to various objects. In one example the mounting location will allow the device to be secured to a music stand or tripod. In another example the device is secured to a harness. The harness, similar to that of a marching bass drum, will allow for the device to be carried and played with relative ease. In these embodiments lighter materials may be used to create the device such as plastic or aluminum.

In another embodiment the device is used as a wind chime. In this embodiment the device is similar to the other devices described herein. There are several slight modifications made to operate the device via wind power. First, the device is placed in a horizontal position. This will remove the force of gravity from spinning the rotational device. This will require the hammer position to also change in some embodiments. The hammer may be moved such that it is secured to an upper sidewall such that it will still function like a pendulum. In another embodiment the hammer is secured in a fixed manner or with a biased back towards the bells. This will ensure that the hammer always strikes the at least one bell. Another addition to the device is wind catching fins. These fins will catch the wind and cause the rotational device to spin thus striking the at least one bell.

In yet another embodiment the device is modified to function similar to a music box. In this embodiment the rotational device is spun via a spring. The spring will be fixed to the frame at one end and fixed to the spindle at another end. When the spindle is rotated in a set direction the spring will be put under pressure. When the spindle is released the spring will force the rotational device to rotate in order to release the pressure on the spring. In one embodiment there is a brake secured to the frame in frictional contact with the rotational device. This will allow a user to select the rotational speed of the rotational device as the spring unwinds.

In a further embodiment the at least one bell is not fixed to the rotational device but is rotatably secured to the rotational device. In this embodiment the rotational device is proportioned such that it has a width that is wider than that of the widest used bell. The rotational device then has a channel placed therein. In one embodiment each bell has a channel. In another embodiment one channel may hold multiple bells. Within the channel each bell is rotatably secured to the rotational device. This will allow the bells to always point in a single direction even as the rotational device is spun.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bell and hammer rotational device, the device comprises:

a frame comprising at least two side walls;

the frame has a spindle rotatably secured thereto;

a first rotational device is coupled to the spindle, wherein the spindle will rotate the first rotational device;

at least one bell is secured about the first rotational device;

a first bell hammer is secured to the frame, wherein the first bell hammer is positioned such that it will strike the at least one bell of the first rotational device, at least once, with each revolution of the first rotational device;

a second rotational device is coupled to the spindle, wherein the spindle will rotate the second rotational device;

at least one bell is secured about the second rotational device;

a second bell hammer is secured to the frame, wherein the second bell hammer is positioned such that it will strike the at least one bell of the second rotational device, at least once, with each revolution of the second rotational device.

2. The bell and hammer rotational device of claim 1, further comprising a plurality of bells secured, respectively, about a perimeter of the first rotational device and a perimeter of the second rotational device.

3. The bell and hammer rotational device of claim 2, wherein each of the plurality of bells is secured at equal distances apart about the rotational devices.

4. The bell and hammer rotational device of claim 1, wherein the first bell hammer and the second bell hammer are each rotatably secured to the frame.

5. The bell and hammer rotational device of claim 1, further comprising a handle secured to the spindle.

6. The bell and hammer rotational device of claim 4, further comprising a first counterweight secured to the first bell hammer at an upper end of a first hammer shaft;

a second counterweight secured to the second hammer at an upper end of a second hammer shaft.

7. The bell and hammer rotational device of claim 2, wherein the plurality of bells is comprised of bells having differing sizes.

8. The bell and hammer rotational device of claim 1, wherein each rotational device is circular.

9. A bell and hammer rotational device, the device comprising:

a frame comprised of a pair of sidewalls;

a spindle rotatably secured to at each of the pair of sidewalls;

the spindle is coupled to a first rotational device, wherein the first rotational device has at least one spoke therein;

the first rotational device has at least one bell secured to the perimeter thereof, wherein the at least one bell is secured via a nut and bolt connection;

a first bell hammer is secured to the frame, wherein the first bell hammer is positioned such that it will strike the at least one bell of the first rotational device, at least once, with each revolution of the first rotational device;

the spindle is coupled to a second rotational device, wherein the second rotational device has at least one spoke therein;

the second rotational device has at least one bell secured about the perimeter thereof, wherein the at least one bell is secured via a nut and bolt connection;

a second bell hammer is secured to the frame, wherein the second bell hammer is positioned such that it will strike the at least one bell of the second rotational device, at least once, with each revolution of the second rotational device.

10. The bell and hammer rotational device of claim 9, further comprising a plurality of bells secured, respectively, about a perimeter of the first rotational device and a perimeter of the second rotational device.

11. The bell and hammer rotational device of claim 10, wherein the each of the plurality of bells is secured at equal distances apart around the first rotational device and second rotational device respectively.

12. The bell and hammer rotational device of claim 9, wherein the first bell hammer and the second bell hammer are each rotatably secured to the frame.

13. The bell and hammer rotational device of claim 9, further comprising a handle secured to the spindle.

14. The bell and hammer rotational device of claim 12, further comprising a counterweight secured to the first bell hammer at an upper end of a first hammer shaft;

a second counterweight is secured to the second bell hammer at an upper end of a second hammer shaft.

15. The bell and hammer rotational device of claim 10, wherein the plurality of bells is comprised of bells having differing sizes.

16. The bell and hammer rotational device of claim 9, further comprising a vibration dampening device placed between the exterior of a base of each bell and the respective rotational devices.

17. The bell and hammer rotational device of claim 9, further comprising at least one mounting bracket secure to the frame, wherein the mounting bracket will allow the device to be secured to a structure.

18. The bell and hammer rotational device of claim 9, wherein each of the nuts and bolts are made of a nylon material.

* * * * *